(12) United States Patent
Dewees

(10) Patent No.: US 10,307,881 B2
(45) Date of Patent: Jun. 4, 2019

(54) OPHTHALMIC LENS PROCESSING APPARATUS WITH IMPROVED USER ACCESSIBILITY

(71) Applicant: NATIONAL OPTRONICS, INC., Charlottesville, VA (US)

(72) Inventor: Robert Kenneth Dewees, Charlottesville, VA (US)

(73) Assignee: National Optronics, Inc., Charlottesville, VA (US)

( * ) Notice: Subject to any disclaimer, the term of this patent is extended or adjusted under 35 U.S.C. 154(b) by 206 days.

(21) Appl. No.: 15/439,393

(22) Filed: Feb. 22, 2017

(65) Prior Publication Data

US 2018/0236624 A1 Aug. 23, 2018

(51) Int. Cl.
| | |
|---|---|
| *B24B 41/02* | (2006.01) |
| *B24B 9/14* | (2006.01) |
| *G02C 7/02* | (2006.01) |
| *B24B 13/00* | (2006.01) |
| *B24B 41/06* | (2012.01) |
| *B23Q 1/66* | (2006.01) |

(52) U.S. Cl.
CPC ............. *B24B 9/14* (2013.01); *B23Q 1/66* (2013.01); *B24B 13/00* (2013.01); *B24B 41/02* (2013.01); *B24B 41/06* (2013.01); *G02C 7/02* (2013.01); *G02C 2202/08* (2013.01)

(58) Field of Classification Search
CPC ........ G02C 7/02; G02C 2202/08; B24B 9/14; B24B 41/06; B24B 41/02; B24B 13/00; B23Q 1/66
USPC .......................................... 451/42, 277, 240
See application file for complete search history.

(56) References Cited

U.S. PATENT DOCUMENTS

| | | | | |
|---|---|---|---|---|
| 2,589,488 A | * | 3/1952 | Fowler | B24B 13/043 451/121 |
| 2,994,164 A | * | 8/1961 | Dalton | B24B 13/0037 451/262 |
| 3,187,469 A | * | 6/1965 | Slack | B24B 13/02 451/163 |
| 3,686,796 A | * | 8/1972 | Clark | B24B 13/0031 451/360 |

(Continued)

FOREIGN PATENT DOCUMENTS

| | | |
|---|---|---|
| DE | 3921313 A1 | 1/1990 |
| JP | 2001047348 A | 2/2001 |

OTHER PUBLICATIONS

Corresponding search report for PCT/US2017/019090, dated Nov. 16, 2017.

*Primary Examiner* — Joseph J Hail
*Assistant Examiner* — Arman Milanian
(74) *Attorney, Agent, or Firm* — Berenato & White, LLC

(57) ABSTRACT

An ophthalmic lens processing apparatus is provided that includes a housing, a support structure, and ophthalmic lens processing components configured to perform an ophthalmic process on an ophthalmic lens. The housing includes a case and a user access member. The support structure includes a support plate received within and movably connected to the case. At least one of the ophthalmic lens processing components is mounted to and movable with the support plate. Also provided is a method of improving user accessibility to the at least one ophthalmic lens processing components of the ophthalmic lens processing apparatus.

21 Claims, 13 Drawing Sheets

(56) References Cited

U.S. PATENT DOCUMENTS

| | | | |
|---|---|---|---|
| 4,191,501 A * | 3/1980 | Sinklier | B24B 9/14 |
| | | | 409/104 |
| 4,769,954 A | 9/1988 | Hatas et al. | |
| 4,908,991 A * | 3/1990 | Longuet | B24B 9/146 |
| | | | 451/228 |
| 4,928,439 A | 5/1990 | Ramos et al. | |
| D326,664 S | 6/1992 | Kennedy et al. | |
| 5,165,202 A * | 11/1992 | Spindel, Jr. | B23Q 35/103 |
| | | | 409/104 |
| D381,343 S | 7/1997 | Elie | |
| D386,504 S | 11/1997 | Dieck | |
| 5,967,884 A | 10/1999 | Takubo et al. | |
| D422,289 S | 4/2000 | Mariotta et al. | |
| 6,080,044 A * | 6/2000 | Lanham | B24B 13/0031 |
| | | | 451/277 |
| 6,099,383 A | 8/2000 | Mizuno et al. | |
| D467,948 S | 12/2002 | Powers | |
| 6,859,336 B1 | 2/2005 | Wada et al. | |
| D581,957 S | 12/2008 | Elie | |
| 7,591,710 B2 * | 9/2009 | Drain | B24B 13/02 |
| | | | 451/11 |
| 8,083,572 B2 | 12/2011 | Nauche | |
| 8,747,187 B2 | 6/2014 | Lemaire et al. | |
| D738,510 S | 9/2015 | Wing et al. | |
| D740,949 S | 10/2015 | Billard et al. | |
| 2004/0048555 A1 | 3/2004 | Jinbo | |
| 2005/0079798 A1 | 4/2005 | Werner et al. | |
| 2006/0286902 A1 * | 12/2006 | Covarrubias | B23K 26/0823 |
| | | | 451/5 |
| 2011/0065361 A1 * | 3/2011 | Schussler | B24B 13/00 |
| | | | 451/11 |
| 2013/0344778 A1 * | 12/2013 | Schafer | B24B 13/023 |
| | | | 451/294 |
| 2014/0051338 A1 * | 2/2014 | Hong | B24B 3/54 |
| | | | 451/66 |
| 2015/0038061 A1 * | 2/2015 | Wallendorf | B24B 13/00 |
| | | | 451/70 |
| 2015/0266156 A1 * | 9/2015 | Kondoh | B24B 41/02 |
| | | | 451/285 |

* cited by examiner

OPHTHALMIC LENS PROCESSING APPARATUS WITH IMPROVED USER ACCESSIBILITY

FIELD OF THE INVENTION

The present invention generally relates to ophthalmic lens processing apparatuses, such as used to shape the periphery of ophthalmic lenses in order to be received in eyeglass frames, and to related methods of making and using the apparatuses.

BACKGROUND

Eyeglass lenses are curved in such a way that light is correctly focused onto the retina of a patient's eye, improving vision. Typically, the lenses are formed from glass or plastic lens "blanks" having certain desired properties to provide the correct prescription for the patient. The blanks are usually circular and of substantially larger dimension, for example 70 mm in diameter and 10 mm thick, compared to the relatively smaller finished lenses assembled into eyeglass frames. While the apparatuses described herein are directed primarily to prescription lens fabrication, the apparatuses have utility for shaping the periphery or otherwise preparing other ophthalmic lenses, such as non-prescription lenses for being fitted into the lens opening of eyeglass frames.

Ophthalmic laboratory technicians use processing equipment and machines to edge lenses to fit into openings of the eyeglass frame selected by the patient. The lens blank may be shaped using an edger, such as the lens edger disclosed in U.S. Pat. No. 6,203,409 to Kennedy et al. The blank is shaped or "edged" so that the periphery of the finished lens fits into the eyeglass frame opening. Additionally, there may be a need to drill one or more holes into or through the lens blank in order to accept screws, prongs and the like used for connecting the lens to frames, nose bridges, and other attachments.

Edging of a lens blank typically requires the application of a block to a surface of the blank. The block is releasably secured to a clamp assembly, so that rotation of the clamp assembly causes corresponding rotation of the lens blank. The periphery of the blank is cut to the desired size using a rotating tool, such as a router tool. The periphery of the cut blank subsequently may be polished using a polishing tool. A bevel is often formed about the periphery of the lens to mate with a groove above the frame opening in order to secure the lens in the opening. These routing, beveling, drilling, and polishing steps may be carried out by the same ophthalmic lens processing machine using different tools.

Ophthalmic lens processing equipment used to perform the above-described edging, polishing, beveling, and/or other steps desirably is operated efficiently over many years in a wide range of environments to process thousands of lens blanks into prescription or non-prescription lenses. Therefore, ease of servicing and maintaining the equipment over its lifetime is important to continue and prolonged use. Often, it is difficult for a user, such as the machine operator or technician, to access equipment components that need to be or desirably are serviced, inspected, and/or replaced. This lack of accessibility can also create issues during initial assembly of the ophthalmic lens processing equipment.

Another problem associated with ophthalmic lens processing equipment is that the machine operator or technician often must displace or remove certain equipment components in order to reach and service, inspect, and/or replace lesser accessible equipment components. The displacement, removal and replacement of equipment components can adversely affect the accuracy of the replaced equipment components. It would be a significant improvement if the service equipment components could be accessed while providing for improved repeatability and consistency in regards to positioning of the displaced and replaced components.

Moreover, a typical edging machine has a large footprint. The edger is usually mounted on a table or support. Optical laboratories want to minimize space requirements in order to more efficiently locate equipment and to reduce floor space costs. Thus, reductions in the edger footprint can bring about savings.

BRIEF SUMMARY OF THE INVENTION

A first aspect of the invention provides an ophthalmic lens processing apparatus that includes a housing, a support structure, and ophthalmic lens processing components. The housing includes a case and a user access member. The support structure includes a support plate received within and movably connected to the case to permit non-linear movement of at least a portion of the support plate. The ophthalmic lens processing components are configured to perform a lens shaping process on an ophthalmic lens. At least one of the ophthalmic lens processing components is mounted to and movable with the support plate relative to the case.

According to a second aspect of the present invention, a method is provided of improving user accessibility to an ophthalmic lens processing component of an ophthalmic lens processing apparatus. The ophthalmic lens processing apparatus includes a housing, a support structure, and ophthalmic lens processing components. The housing includes a case and a user access member. The support structure includes a support plate received within and movably connected to the case to permit non-linear movement of at least a portion of the support plate. The ophthalmic lens processing components are configured to perform a lens shaping process on an ophthalmic lens, with at least one of the ophthalmic lens processing components being mounted to and movable with the support plate. The method includes moving the support plate relative to the case to improve user accessibility to the at least one of the ophthalmic lens processing components mounted to the support plate.

Yet another aspect of the invention is a method of edging an optical lens, comprising the steps of providing a lens edger having a housing having a pivotally mounted plate carrying a rotatable lens chuck and an adjacent cooperating rotatable edging tool. The edger having a door permitting access to the lens chuck and the plate being pivotable between an angularly offset position and a horizontal operating position. The plate is pivoted into the horizontal operating position. A lens blank is secured to the lens chuck. The lens chuck and the edging tool are operated cooperatively and cause the edging tool to edge the lens. The edged lens blank is removed from the lens chuck.

Other aspects of the invention, including devices, systems, components, assemblies, sub-assemblies, methods, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention, wherein.

Figure 1:
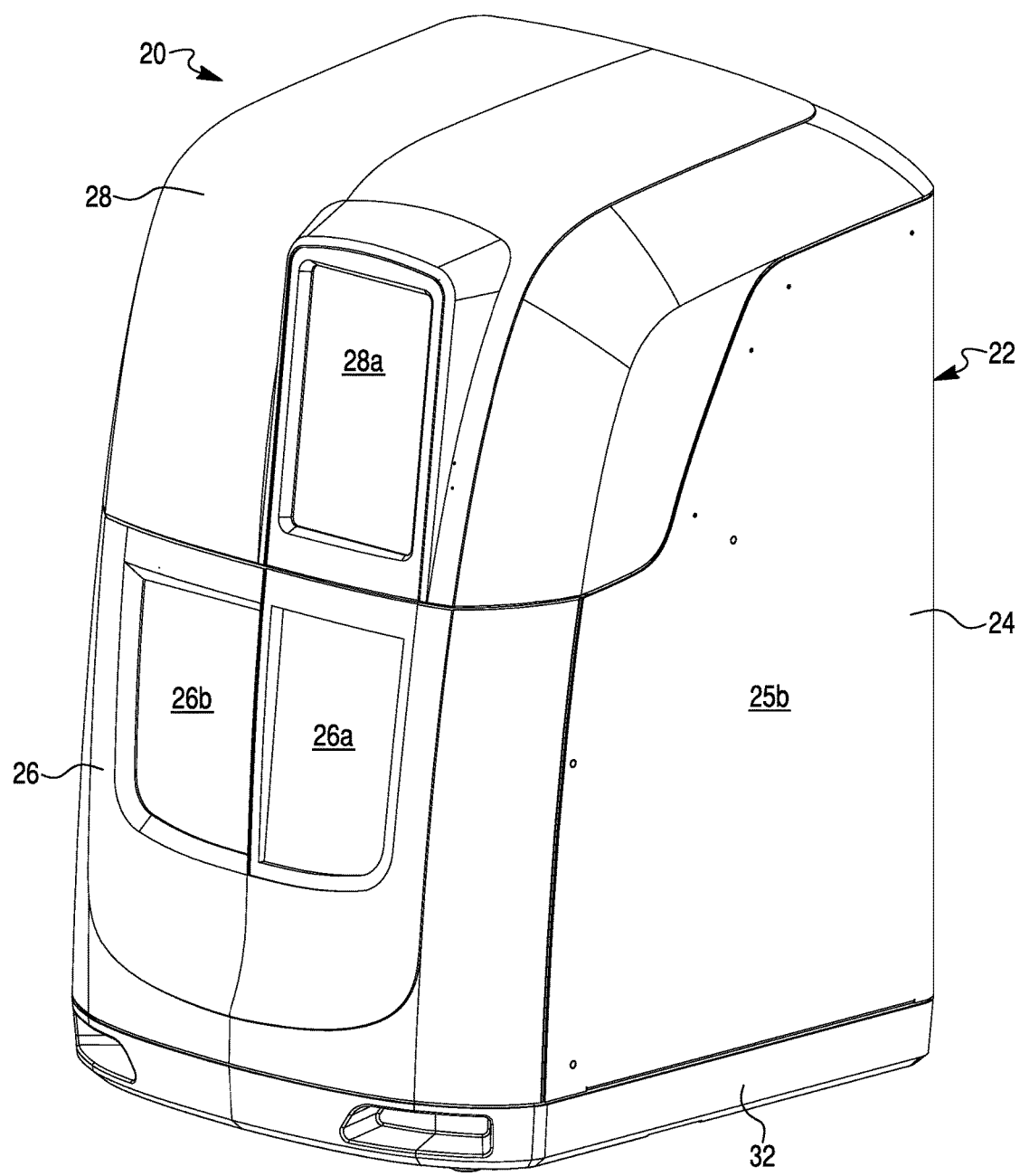
FIG. 1 is a perspective view of an ophthalmic lens processing apparatus according to an embodiment of the invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative apparatuses and methods, and illustrative examples shown and described in connection with the exemplary embodiments and methods.

This description of exemplary embodiments is intended to be read in connection with the accompanying drawings, which are to be considered part of the entire written description.

An exemplary embodiment of an ophthalmic lens processing apparatus or device is generally designated in the drawings by reference numeral 20. The ophthalmic lens processing apparatus 20 illustrated in the drawings is embodied as a multi-function machine capable of consecutively performing several processing steps, including edging a lens, drilling one or more holes into or through the lens, beveling, and polishing the thus formed lens edge. The principles of the present invention may be applied to other ophthalmic lens processing apparatuses, and apparatuses adapted to perform one or multiple ophthalmic lens processing steps, e.g., edging, drilling, polishing, beveling, or any combination of thereof.

The ophthalmic lens processing apparatus 20 includes a housing 22 that includes a cavity or chamber containing ophthalmic lens processing components, several of which are individually described below. The ophthalmic lens processing components are adapted to perform one or more lens fabrication processes, such as edging, on an ophthalmic lens. In a preferred embodiment, processing tools such as routers, drills, mills, and polishers can be interchanged for maintenance or to perform multiple functions, including processing of the blank into an ophthalmic lens suitable for mounting in an eyeglass frame. The housing 22 may be positioned on a support table or the like, which allows connection to vacuum lines, electrical supply lines, and the like.

Figure 8:
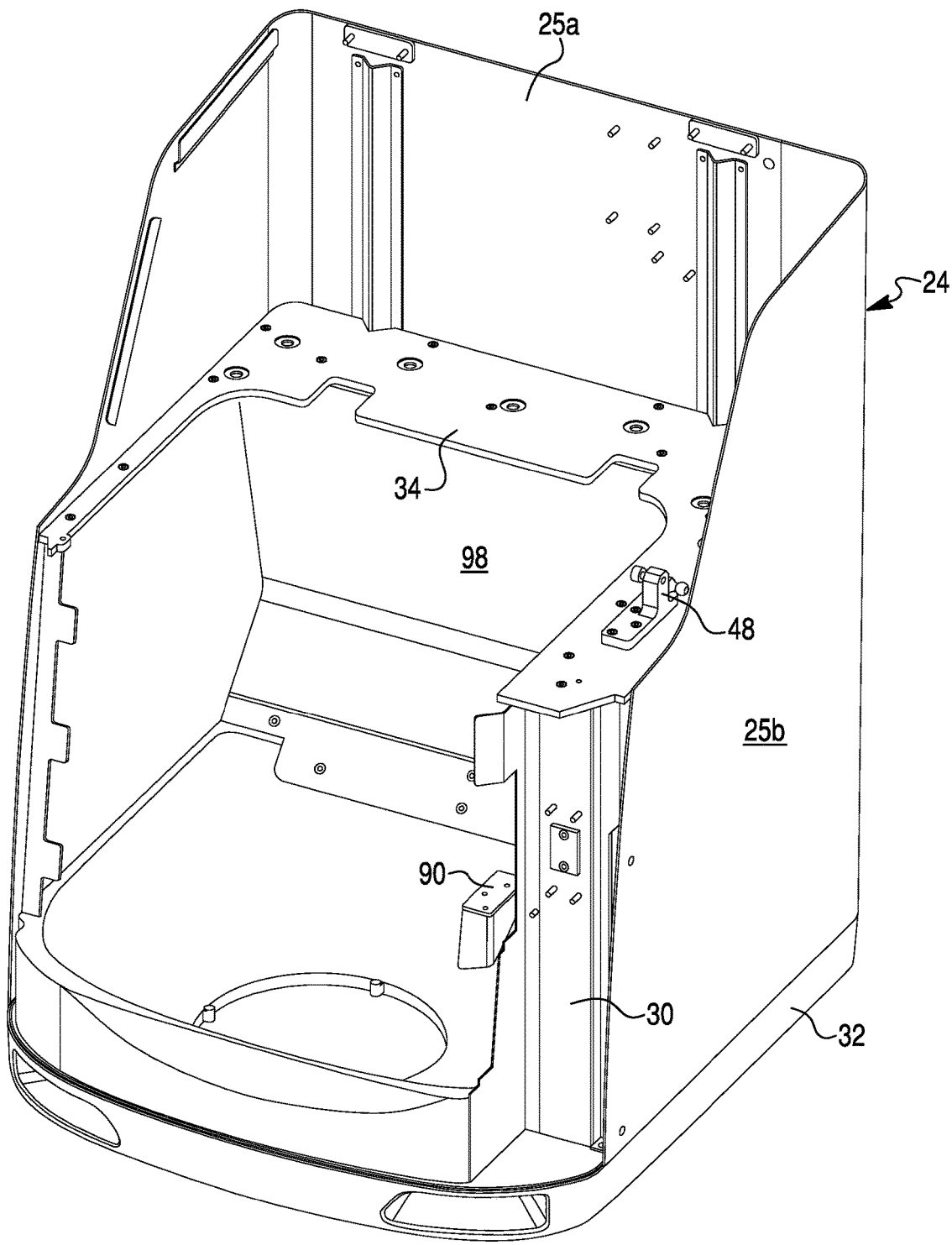
FIG. 8 is a perspective view of an embodiment of the case of the apparatus.
Figure 9:
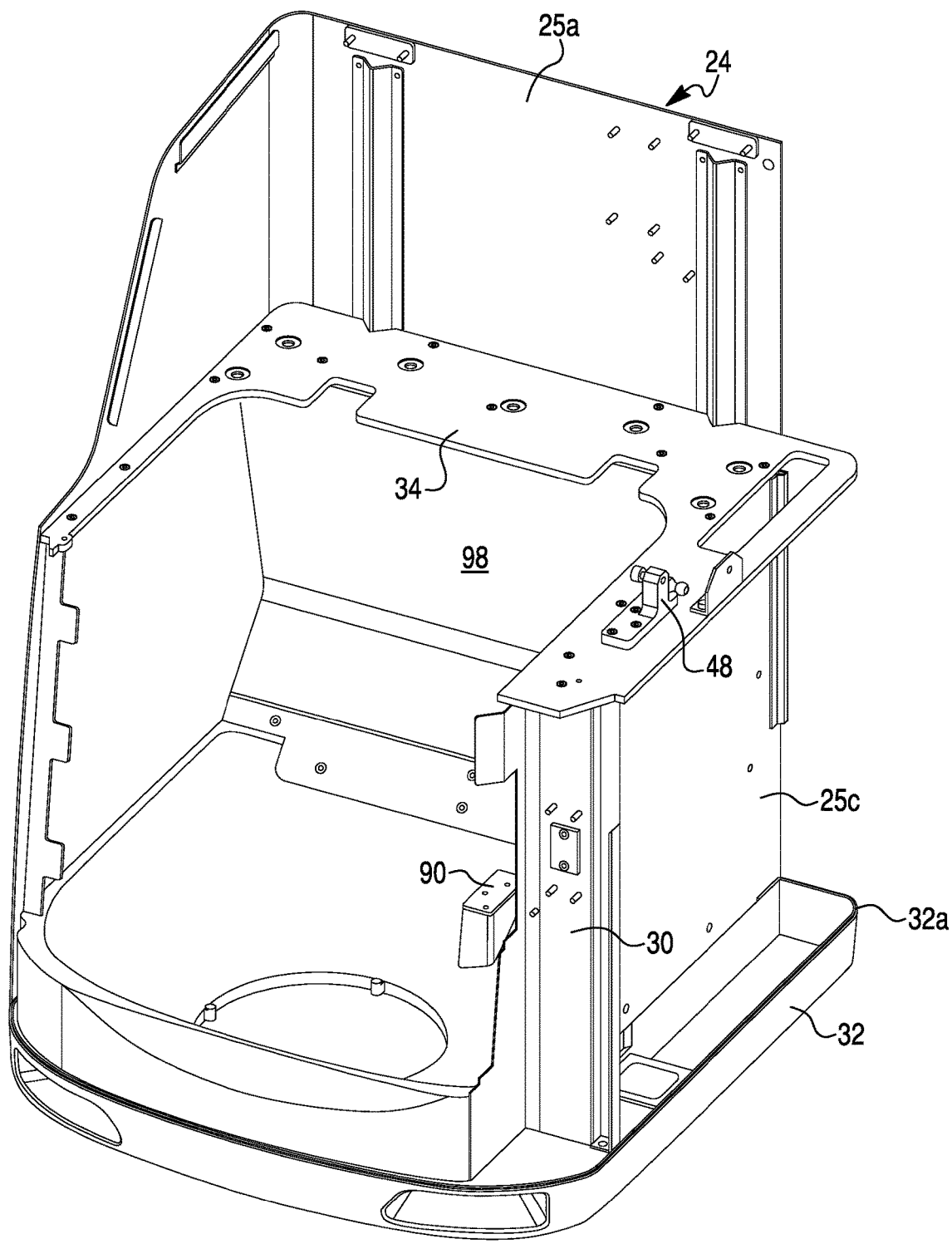
FIG. 9 is another perspective view of the case of the apparatus with a panel member removed.

As best shown in FIGS. 8 and 9, the ophthalmic lens processing apparatus 20 comprises a case 24 including a first panel member 25a defining a left side and rear of the case 24, and a second panel member 25b defining a right side of the case 24. FIG. 9 shows the second panel member 25b removed to reveal an internal panel 25c of the case 24. The internal panel 25c receives a removable electrical panel (not shown in FIG. 9). The first and second panel members 25a and 25b sit on and are attached to a peripheral rim 32a of base 32 of the case 24. Also attached to the base 32 is a vertical internal door bracket 30. The case 24 further includes a horizontal stationary plate 34 securely attached to the panels members 25a-25c and the door bracket 30. Fasteners such as screws, bolts, rivets, and the like may be used to attach the panel members 25a-25c, the door bracket 30, the base 32, and the stationary plate 34 to one another.

Figure 7:
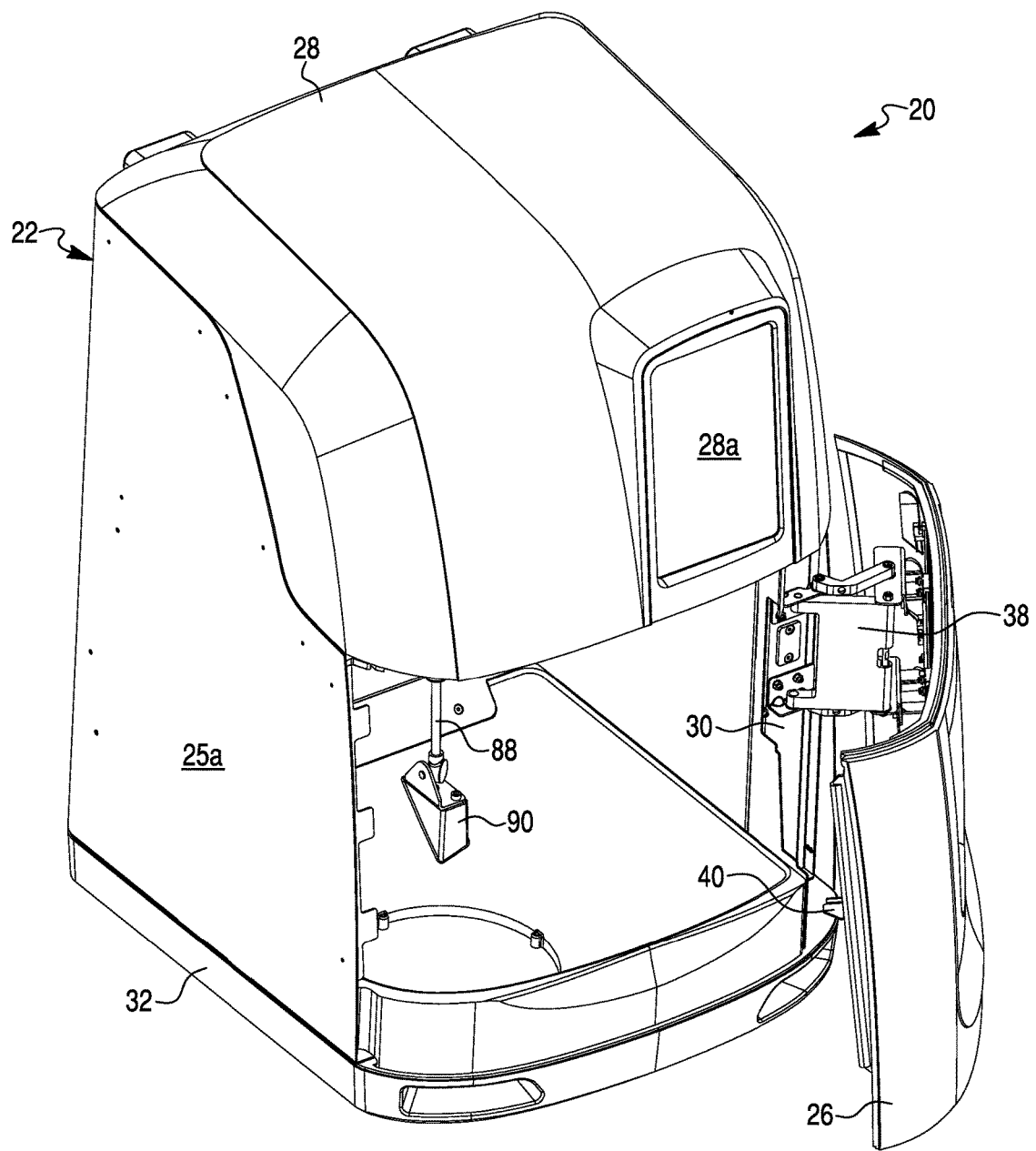
FIG. 7 is a perspective view of the apparatus with the door in an open position and with ophthalmic lens processing components not shown for simplification and explanatory purposes.

The housing 22 further includes a service door 26 configured as a panel member situated at the front of the housing 22 above the front of the peripheral rim 32a of the base 32. The service door 26 is movably connected to the door bracket 30 of the case 24, which is fixed at opposite ends to the base 32 and the stationary plate 34. The connection preferably is a hinged connection that permits movement of the service door 26 between a closed door position and an open door position. FIG. 7 illustrates an example of a hinge assembly 38 for pivotally mounting the service door 26 to the door bracket 30. In FIG. 7, ophthalmic lens processing components have been omitted from the drawing to focus attention on the service door 26 features, including the hinge assembly 38 that pivotally connects the service door 26 to the case 24. The opposite side (left side in FIG. 7) of the service door 26 includes a catch 40 that engages the panel member 25a to retain the service door 26 in the closed door position. Although not shown, additional latching and/or locking mechanisms may be provided, if desired, to retain and/or lock the service door 26 in the closed door position.

In the closed door position, the closed service door 26 aligns with side panel members 25a and 25b, preferably in a relatively snug relationship to provide a mating relationship. The service door 26 includes a front transparent window 26a for permitting the user to view the ophthalmic lens processing components located in the lower portion of the inside of the housing 22 when the service door 26 is in the closed door position. The service door 26 also includes a front transparent horizontal sliding door 26b for the user to insert and remove ophthalmic lenses for processing. Opening of the service door 26 by pivotal movement about the hinge assembly 38 allows a user to access the ophthalmic lens processing components located in the lower portion of the inside of the housing 22.

In the drawings, the hinge assembly 38 pivotally connects the service door 26 to the case 24. It should be understood that any suitable hinge may be used for connecting the service door 26 to the case 24. Alternatively, other connections that are non-pivotal may also be used for connecting the service door 26 to the case 24. The service door 26 may be completely removable from the case 24.

Figure 5:
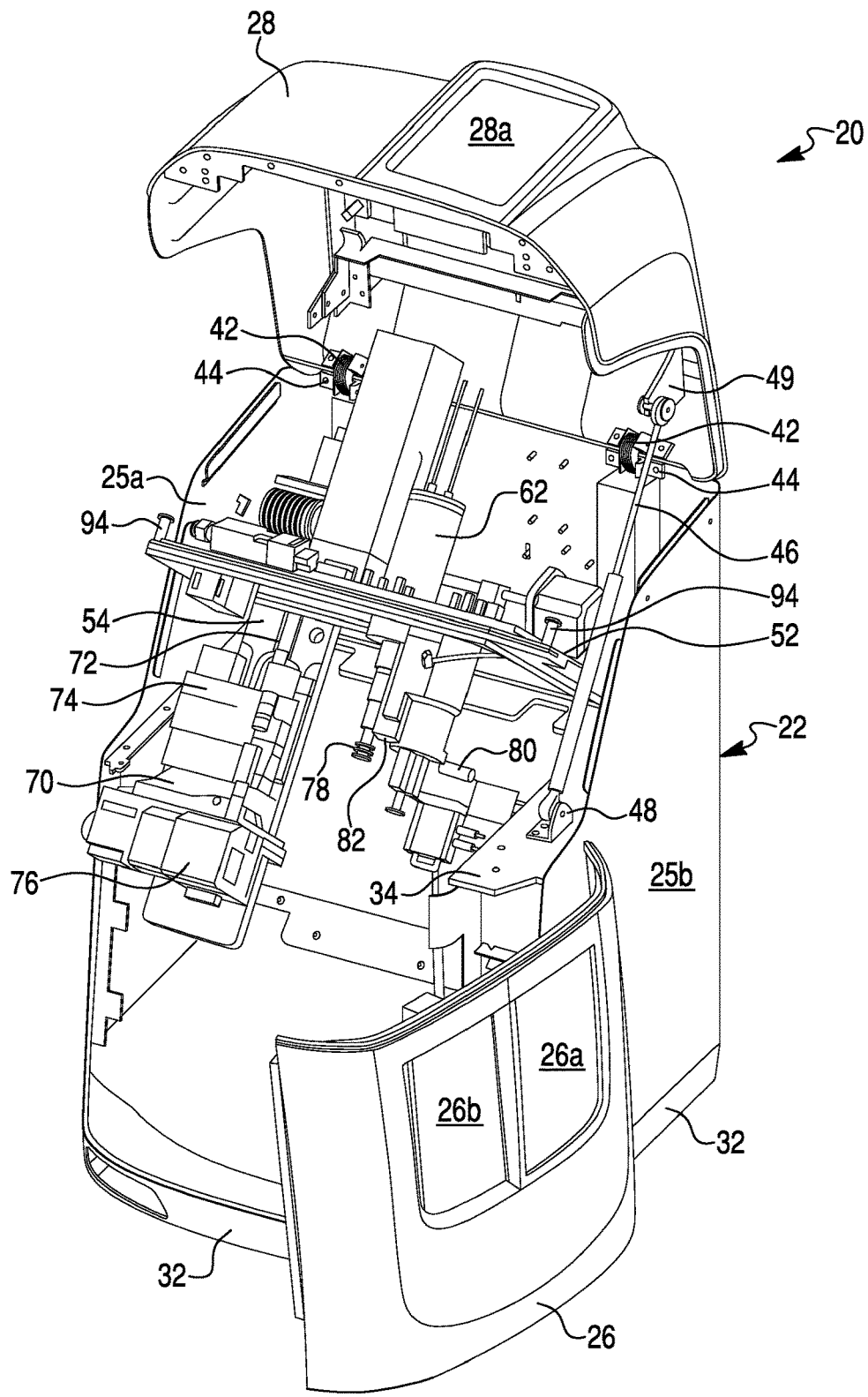
FIG. 5 is a perspective view of the ophthalmic lens processing apparatus of FIG. 1 with the hood and the door of the apparatus in open positions and the support structure in a tilted position.

A hood (or lid) 28 of the housing 22 is pivotally mounted to the rear portion of the first panel member 25a of the case 24 to permit movement of the hood 28 between a closed hood position and an open hood position. As best shown in FIG. 5, first hinge parts 42 are mounted proximate a rear edge of an inner surface of the hood 28, and second hinge parts 44 are mounted proximate to a top edge of an inner surface of the rear portion of the first panel member 25a. The hinge parts 42 and 44 are thereby hidden from view when the hood 28 is in the closed hood position. A pintle or other hinge part pivotally connects the hinge parts 42 and 44 to one another. Any suitable hinge may used for connecting the hood 28 to the rear portion of the first panel member 25a of the case 24. Alternatively, other connections that are non-pivotal may also be used for connecting the hood 28 to the case 24. The hood 28 may be removable from the case 24.

The hood 28 is shown in the closed hood position in FIG. 1 with a front edge of the hood 28 lowered to seat over the top edge of the closed service door 26. The hood 28 includes a control screen 28a for monitoring and controlling the equipment located in the housing 22 when the hood 28 is in its closed hood position.

The user opens the hood 28 by applying an upward force to the front edge of the hood 28. The hood 28 rises from its lowered closed hood position to its open hood position as the hinge parts 42 and 44 pivot the hood 28 relative to the case 24. In the raised open position, the hood 28 is displaced upwardly to permit user access to the ophthalmic lens processing components mounted in the upper portion of the inside of the housing 22.

Controlled opening and closing of the hood 28 may be regulated using a damper 46 to control the speed of the hood 28 when the hood 28 is being opened and shut. In case an operator lets go of the hood 28, the damper 46 will slow down the hood so it does not fall at full speed. An exemplary commercially available damper 46 is from Guden, PN GDC53-D. A cam stay 96 maintains the hood 28 in one of several positions to which the hood 28 is selectively raised by the user. An exemplary commercially available cam stay is from Guden, PN 7710-02. Dampers and cam stays are commercially available in various sizes and types, including from companies such as H. A. Guden Co., Inc. A lower end of the damper 46 is pivotally connected at a bracket 48 fixedly mounted to the stationary plate 34. An upper end of the damper 46 is pivotally connected to a hood bracket 49 fixedly mounted to the interior surface of the hood 28. The extending movement of a piston rod of the damper 46 is limited by the dimensions of the damper 46, such that in its fully extended position the damper 46 limits the upward movement of the hood 28. The damper 46 regulates the rate at which the hood 28 is raised and lowered so that the hood 28 does not slam downward when closing or "fly" uncontrollably upward when opening. The front edge of a support plate 52 (discussed below) includes a latch 29 (FIGS. 2 and 6) that engages and retains the hood 28 in the closed hood position.

While the housing 22 of the ophthalmic lens processing apparatus 20 is illustrated in the exemplary embodiment as including two user access members 26 and 28, the apparatus 20 may include a single access member or alternatively two, three, four, or more access members.

The ophthalmic lens processing apparatus 20 includes a support structure 50 for mounting a plurality, more preferably a majority, and still more preferably all of the ophthalmic lens processing components thereto. The support structure 50 is received within and movable relative to the case 24 between a lowered position and a titled, raised position discussed further below.

Figure 2:
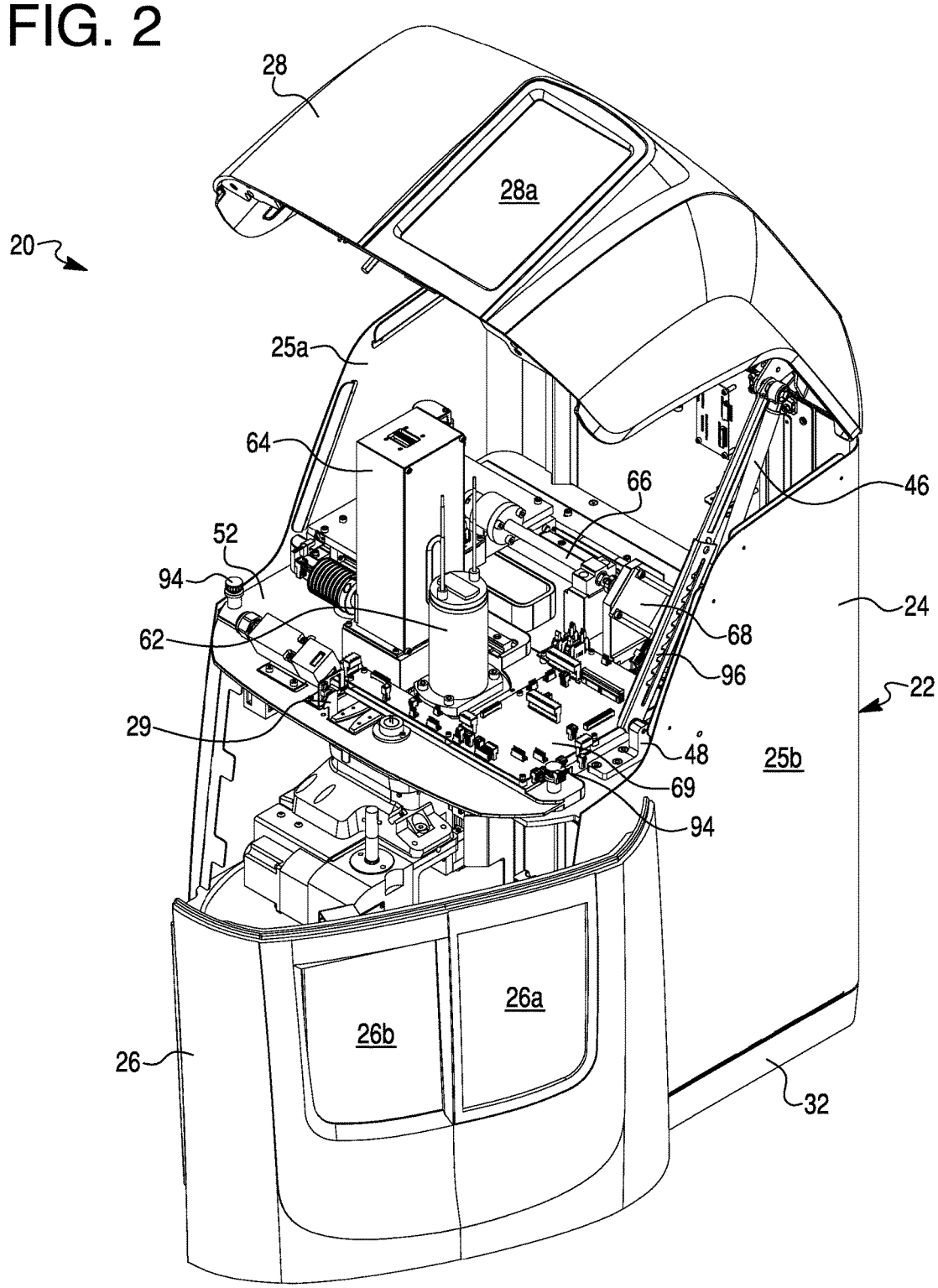
FIG. 2 is a perspective view of the ophthalmic lens processing apparatus of FIG. 1 with a hood and a door of the apparatus in open positions and a support structure in a lowered position.
Figure 3:
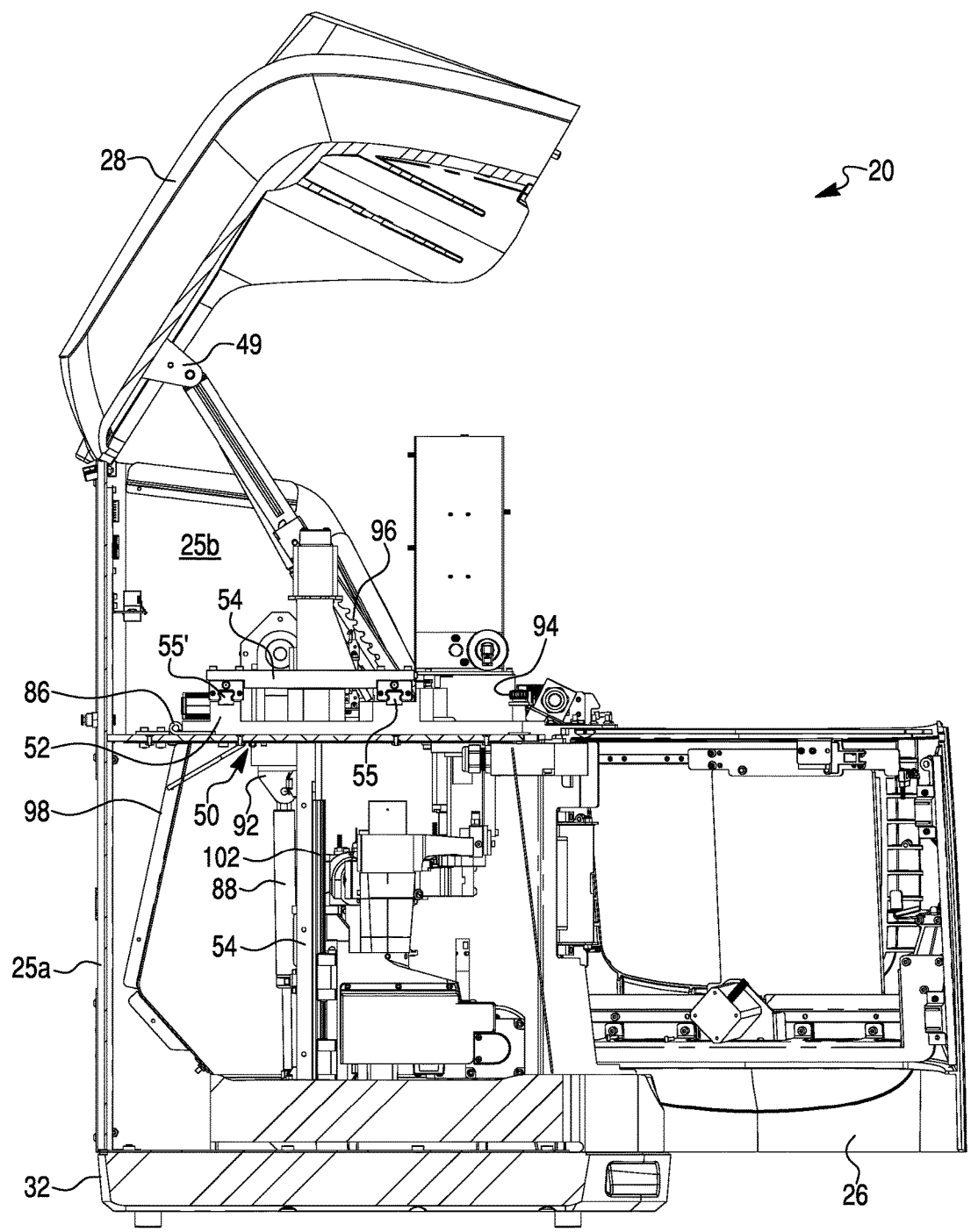
FIG. 3 is a side sectional view of the apparatus in the state of FIG. 2.
Figure 4:
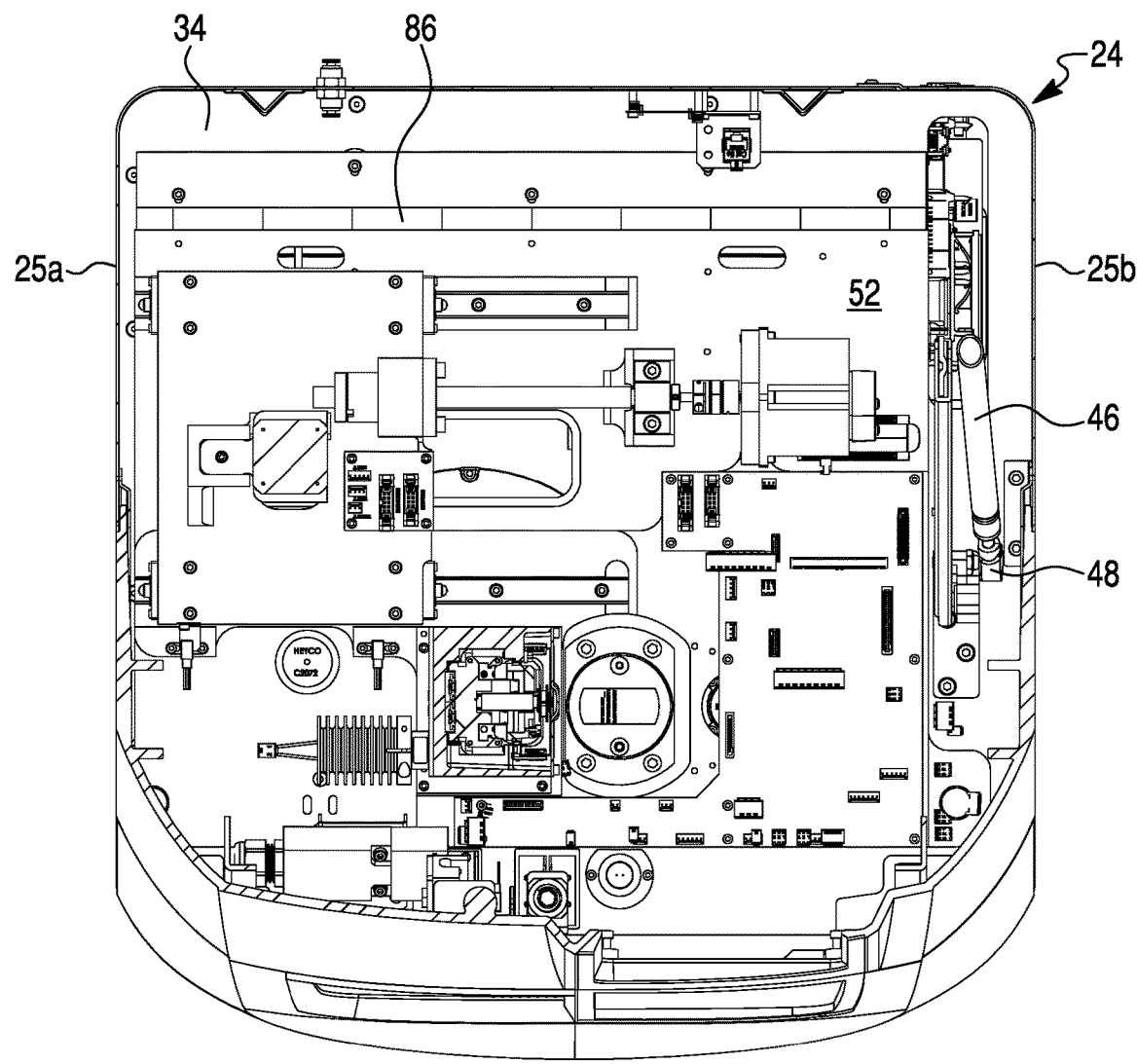
FIG. 4 is a top sectional view of the apparatus in the state of FIG. 1.
Figure 6:
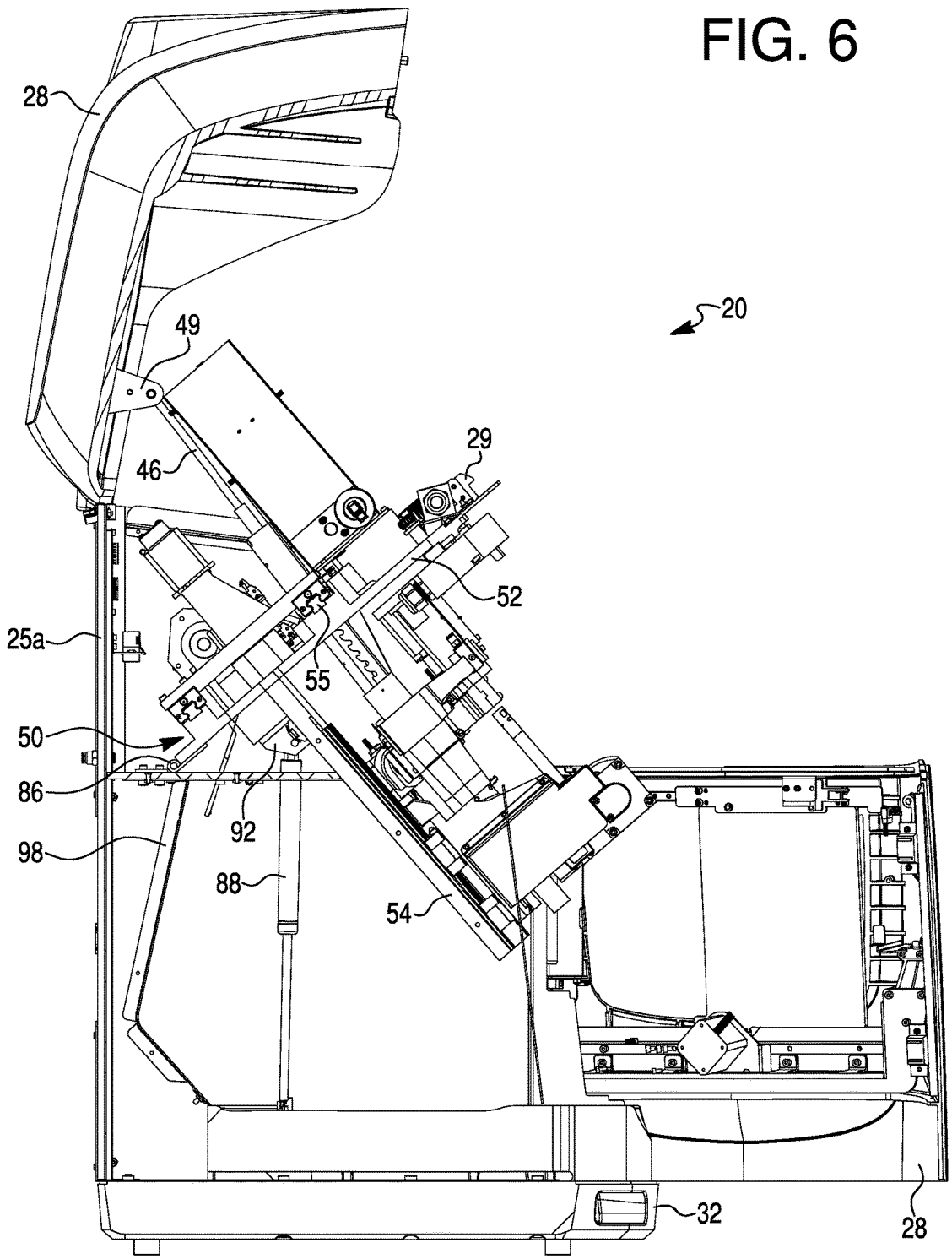
FIG. 6 is a side sectional view of the apparatus in the state of FIG. 5.
Figure 10:
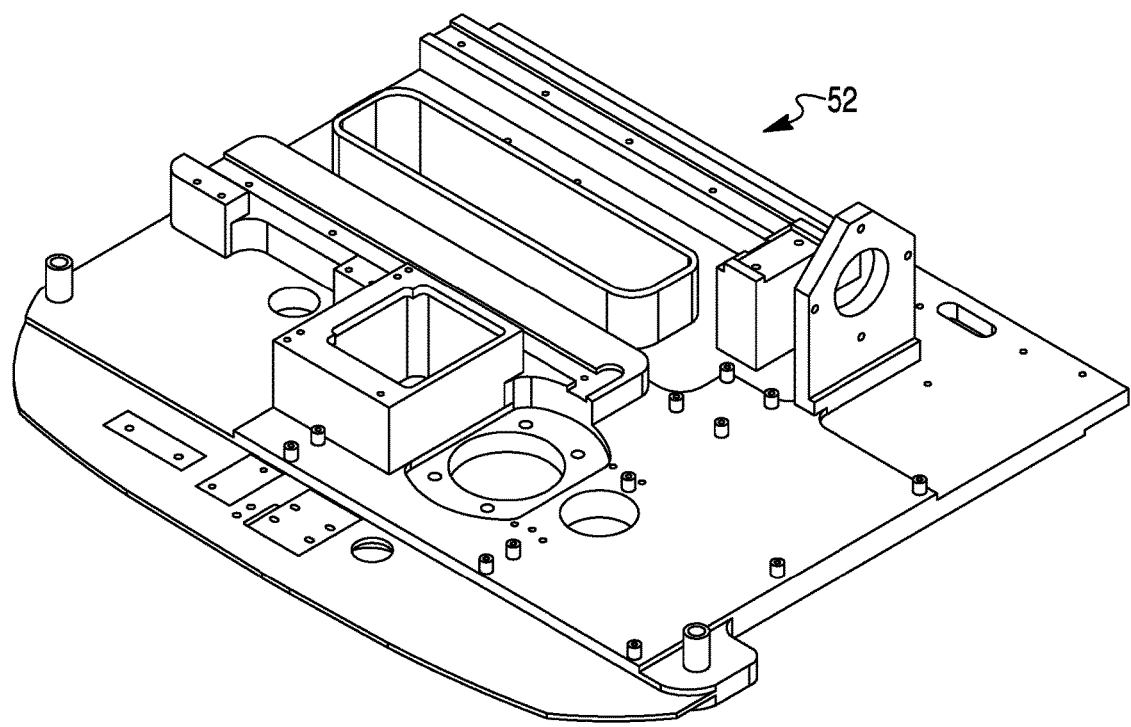
FIG. 10 is a perspective view of an embodiment of a support plate of the apparatus.

The support structure 50 includes a main support plate 52 and a stanchion 54. An enlarged view of the main support plate 52 is shown in FIG. 10. The stanchion 54 extends both above and below the support plate 52. The stanchion 54 is mounted to linear rails 55, as best shown in FIGS. 3 and 6, fixed to the top of the support plate 52. As best shown in FIG. 2, the stanchion 54 is driven left and right (as the apparatus 20 is viewed by an operator from the front) along the spaced, parallel linear rails 55, 55' by a motor 68 and a lead screw 66 mounted on the support plate 52. In the lowered position shown in FIGS. 2-4, the support plate 52 is substantially horizontal, resting on the stationary plate 34 and located at approximately mid-height of the apparatus 20. The stanchion 54, as best shown in FIGS. 3 and 5, is substantially vertically oriented in the lower position, and is mounted as to be substantially perpendicular to the support plate 52 at all times. The support plate 52 and the stanchion 54 preferably are stiff so as to not flex during lens processing operations, and may be made of, for example, cast A356 aluminum or other suitable metal, although other materials may be used.

The ophthalmic lens processing components mounted to the support structure 50 are adapted to perform one or more ophthalmic lens fabrication processes on a blank of an ophthalmic lens. At least one, preferably two, three, four, or more, and still more preferably all, of the ophthalmic lens processing components are mounted to the support structure 50, either directly to the support plate 52 or indirectly to the support plate 52 via the stanchion 54. In the illustrated embodiment, the ophthalmic lens processing components are mounted both on and below the support plate 52. Certain of the ophthalmic lens processing components mounted below the support plate 52 are mounted on the stanchion 54 of the support structure 50.

The ophthalmic lens processing components perform various functions, depending upon the processing operation to be performed by the apparatus 20. The ophthalmic lens processing components may include, for example, translation axes, cutting motors, and the like. Examples of lens processing components mounted on the support plate 52 include a tool spindle 62 rotatable about a longitudinal axis, a lens probing system 64, an x-axis (side-to-side) lead screw 66 that moves the stanchion 54 reciprocatingly side to side along the linear rails 55, 55', the x-axis motor 68, and an interconnecting printed control board (PCB) 69. As best shown in FIG. 5, examples of ophthalmic lens processing components below the support plate 52 and mounted to the support plate 52 or to the stanchion 54 of the support structure 50 include a z-axis carriage 70, a z-axis lead screw 72, a lens clamp 74, a lens rotating gearbox 76, a spindle-driven lens edging tool 78 driven by the tool spindle 62, a drilling system 80, and a polishing water delivery system 82. The lens clamp 74 and the lens rotating gearbox 76 are fixed to the z-axis carriage 70.

The stanchion 54 includes a linear slide mechanism 102, which is similar to the slides 55, 55', that guides the z axis carriage so that it moves straight vertically, that cooperates with the z-axis lead screw 72 to permit upward and downward vertical movement of the z-axis carriage 70 along at least a portion of the stanchion 54. In this manner, the clamped lens blank or ophthalmic lens held by the lens clamp 74 can be manipulated along the z-axis relative to the tool 78 held by the tool spindle 62.

Figure 12:
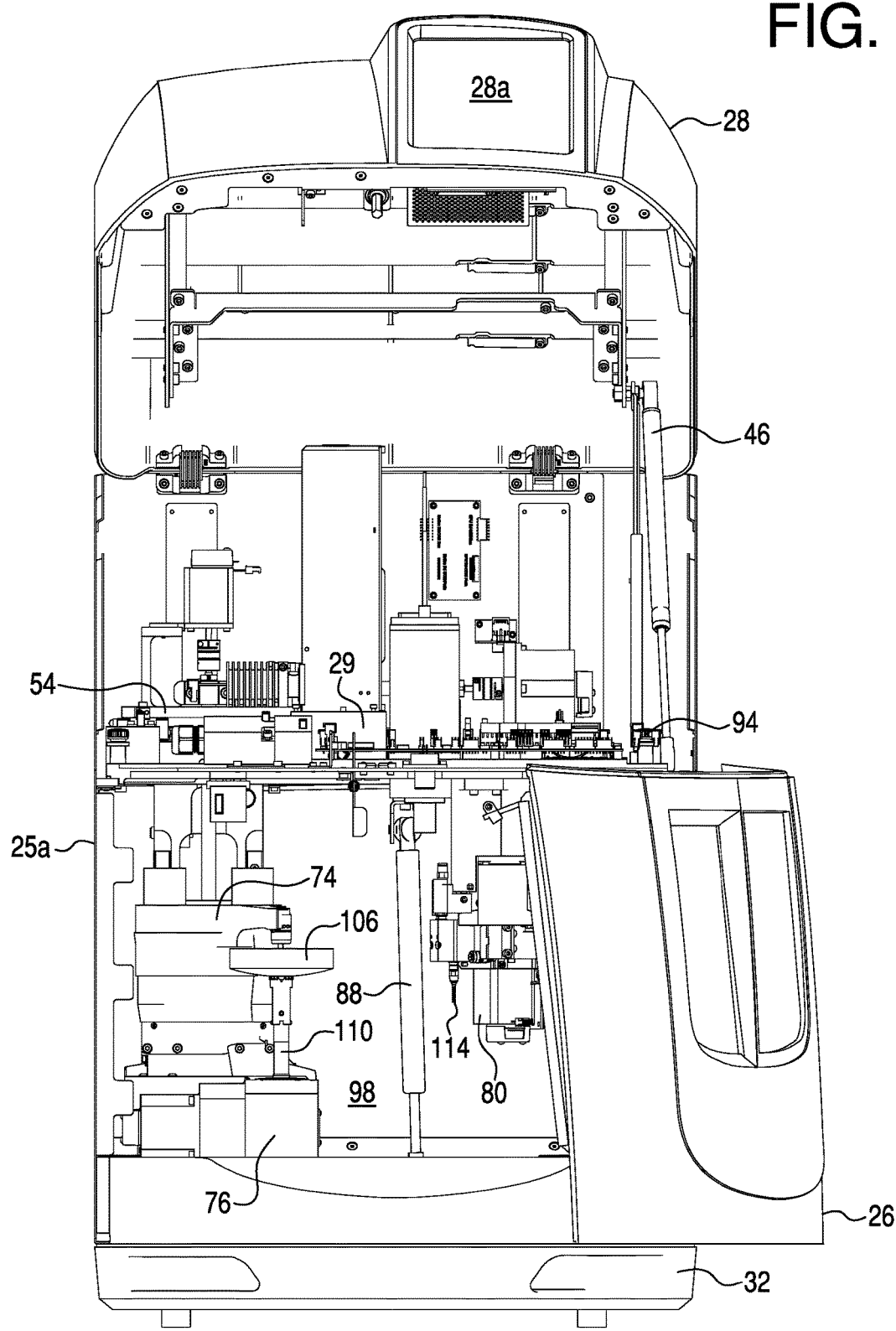
FIG. 12 is an elevational view of FIG. 11.

Processing operations such as edging and polishing and components and tools for performing the operations are well known in the art, and are described, for example, in U.S. Pat. Nos. 7,198,436, 7,029,378, and 6,203,409 to National Optronics, Inc. By way of example, employing the design shown in the drawings, the lens edging tool 78, such as a router, is securely held by the tool spindle 62, which rotates the tool 78 about its longitudinal axis while otherwise holding the tool 78 in place. The lens probing system 64 locates the position of the lens blank, usually by touching a plurality of locations about the lens bank in order to determine the thickness of the blank. The x-axis lead screw 66, and the x-axis motor 68 control side-to-side movement of the lens by controlling side-to-side movement of the stanchion 54. Beneath the support plate 52, the lens blank is held by the lens clamp 74 attached to the z-axis carriage 70 which in turn is movably attached to stanchion 54. Upward and downward movement of the clamped lens blank relative to the tool 78 is controlled by the z-axis lead screw 72, side-to-side movement of the lens blank is controlled by the x-axis carriage 60, and rotation of the lens blank is controlled by the lens rotating gearbox 76. A drill 104, as best shown in FIG. 12, carried by and rotated by the drilling system 80 pivots into position between the lens drive gearbox 76 and the tool 78. The drill is shown in all the figures in a "parked" position—offline towards the back of the apparatus 20. When the drill is engaged, the rotating drill axis can be either substantially vertically tilted at an angle towards the lens so that it can drill angled holes in a lens or oriented angularly as might be necessary taking into account the curvature of the lens face, for example.

The mounting of the ophthalmic lens processing components, preferably all of the ophthalmic lens processing components, directly to the support structure 50 greatly improves dimensional accuracy and mechanical stability of the equipment, and allows the ophthalmic lens processing components associated with translational axes, cutter motors, and the like to be precisely positioned and controlled relative to one another, and minimizes the footprint of the edger 20. The ophthalmic lens processing components above and below the support plate 52 control movement of the lens blank.

As noted above, the support plate 52 is positioned at approximately mid-height of the apparatus 20. As described below in greater detail, to improve user accessibility to ophthalmic lens processing components, especially those located beneath the support plate 52, the support structure 50, and more particularly the support plate 52 of the support structure 50, is movably connected to the stationary plate 34 to pivot upwards and position the ophthalmic lens processing components in a tilted position.

The movable connection between the support plate 52 and the stationary plate 34 is embodied in the drawings as a hinge 86 that permits pivotal movement of the support plate 52. Because the stanchion 54 is connected to the support plate 52, the support plate 52 and the stanchion 54 move in unison. Although one continuous hinge (also sometimes referred to as a piano hinge) 86 is shown in the illustrated embodiment, it should be understood that the hinge 86 may be replaced by two, three, or more hinges.

The hinge 86 is positioned at the rear edge portion of the support plate 52 to pivotally connect the support plate 52 to the horizontal stationary plate 34 of the casing 24. Standard fasteners such as screws, bolts, rivets, etc. may connect the hinge 86 to the support plate 52 and to the stationary plate 34. The hinged connection permits pivotal movement of the support structure 50 relative to the stationary plate 34 of the casing 24 between a lower position shown in FIGS. 2-4 in which the support plate 52 is substantially horizontal and the stanchion 54 is substantially vertical, and a user accessibility raised position shown in FIGS. 5 and 6, in which the front edge of the support plate 52 is raised relative to the lower position along a non-linear path. In the raised position, the support plate 52 is angled, preferably obliquely angled, for example, at an angle of about 45 degrees from horizontal. As the support structure 50 is moved between the lower position and the raised position, the ophthalmic lens processing components mounted to the support structure 50 move with the support structure 50 into a tilted arrangement.

When the support plate 52 is moved into its raised position, user accessibility (through the opened service door 26) to the ophthalmic lens processing components attached to the support structure 50 below the support plate 52 is improved compared to when the support plate 52 is in its lower position. The ophthalmic lens processing components mounted to the support structure 50 below the support plate 52 are transposed upwardly and forwardly towards the front of the apparatus 20. Further, the support plate 52 in its raised position creates less of an obstacle to user access for purposes such as service, inspection, and maintenance of the ophthalmic lens processing components below the support plate 52. Preferably, in the raised position shown in FIGS. 5 and 6, the apparatus 20 is non-operational for safety reasons.

In an optional embodiment, the ophthalmic lens processing components can be easily installed on the support structure 50 prior to installation of the support structure 50 onto the stationary plate 34 which is preferably already installed in housing 22. Easy access to support structure 50 prior to installation in housing 22 allows for more rapid and convenient assembly of the ophthalmic lens processing components than if the components were installed on support structure 50 in the user accessibility position.

The apparatus 20 further includes a support structure lift gas spring 88 embodied as a cylinder-and-rod structure. A lower end of the lift spring 88 is pivotally connected at a base bracket 90 (FIG. 7) fixed to the base 32. An upper end of the lift spring 88 is pivotally connected to a support structure bracket 92 fixed to the bottom of the support plate 52.

The lift spring 88 exerts a biasing force to extend the piston rod into its extended position, urging the support structure 50 towards the raised position shown in FIGS. 5 and 6. In this manner, the upward biasing force exerted by the lift spring 88 assists the operator in lifting the support structure 50, which together with the ophthalmic lens processing components mounted thereto can weigh on the order of, for example, 75 pounds. Desirably, the lift spring 88 is selected so that it does not provide sufficient force to lift the support structure 50 from its horizontal position without some assistance from the operator, thus preventing the support structure 50 from pivoting upward on its own without user assistance.

The extending movement of the piston rod is limited by the dimensions of the lift gas spring 88, such that in its fully extended position the lift gas spring 88 limits the pivotal upward movement of the support structure 50. Pressurization of the chamber within the cylinder dampens and regulates the rate at which the support structure 50 is raised and lowered, for example to prevent downward slamming of the support structure 50 against the stationary plate 34. Downward force applied by the user to the support structure 50 overcomes the biasing force of the lift spring 88, permitting the user to lower the support structure 50 into its lower position.

In the illustrated embodiment, screws 94 retain the support structure 50 in its lowered position. Alternatively, a latch and/or lock for coupling the support structure 50 to the stationary plate 34 may be provided to selectively retain the support structure 50 in the lowered, operative position and permit lifting of the support structure 50 into its raised position.

The lift spring 88 may be, for example, a commercially available gas spring of the type commonly used in vehicles such as cars and trucks to open the trunk or the hood. It should be understood that other types of connections may be used in combination or as alternatives for the lift spring.

Near the rear of the inside of the housing 22 is a stiffness member 98 that may be made of sheet metal, as best shown in FIGS. 3 and 6. The stiffness member 98 provides added stiffness to the apparatus 20. The stiffness member 98 may be a relatively smooth internal surface for catching lens cutting debris and allowing the user to collect and remove the cutting debris. Moving the support structure 50 into its user accessibility position allows for easier access to this area for removing the lens cutting debris.

The parts of the ophthalmic lens processing apparatus 20 may be assembled in any suitable order. For example, the panels 25*a*-25*c* and the door bracket 30 can be mounted to the base 32, followed by mounting of the stationary plate 34 to build the case 24. The support structure 50 is thereafter connected by hinge 86 to the stationary plate 34. The ophthalmic lens processing components can be mounted to the support structure 50 before or after the support structure 50 is hingedly connected to the stationary plate 34. If support structure 50 is mounted to the stationary plate 34 before the ophthalmic lens processing components are mounted on the support structure 50, the support structure 50 may be pivoted to its user accessibility raised position to facilitate mounting of components below the support plate 52. The service door 26 and the hood 28 may then be mounted as described above.

It should be understood that this exemplary method is not the only method for assembling the apparatus described herein, and is not exhaustive of possible modifications and variations that may be practiced. While the methods for assembling the apparatus may be practiced by successively performing the steps as set forth below, it should be understood that the methods may involve performing the steps in different sequences, or combining steps, adding steps not described herein, or eliminating steps described herein.

To move the support structure 50 from the lower position to the raised position for improving user accessibility, the user opens the service door 26 and the hood 28, and unscrews the screws 94 that retain the support structure 50 in the lower position. An upward force exerted on the front of the support plate 52, together with the biasing force applied by the lift gas spring 88, is typically sufficient to pivot the support structure 50 into its raised position. The ophthalmic lens processing components below the support plate 52 are thereby more easily accessed for inspection, servicing, and/or replacement. The support structure 50 can be returned to its lowered position to inspect, service, and/or replace the ophthalmic lens processing components positioned above the support plate 52. When it is time to return the support structure 50 to its lowered position, the user applies a sufficient downward force to the front of the support plate 52 to overcome the biasing force exerted by the lift gas spring 88 until the support plate 52 is substantially horizontal. The screw 94 is then engaged to retain the support structure 50 in its lower position.

Figure 11:
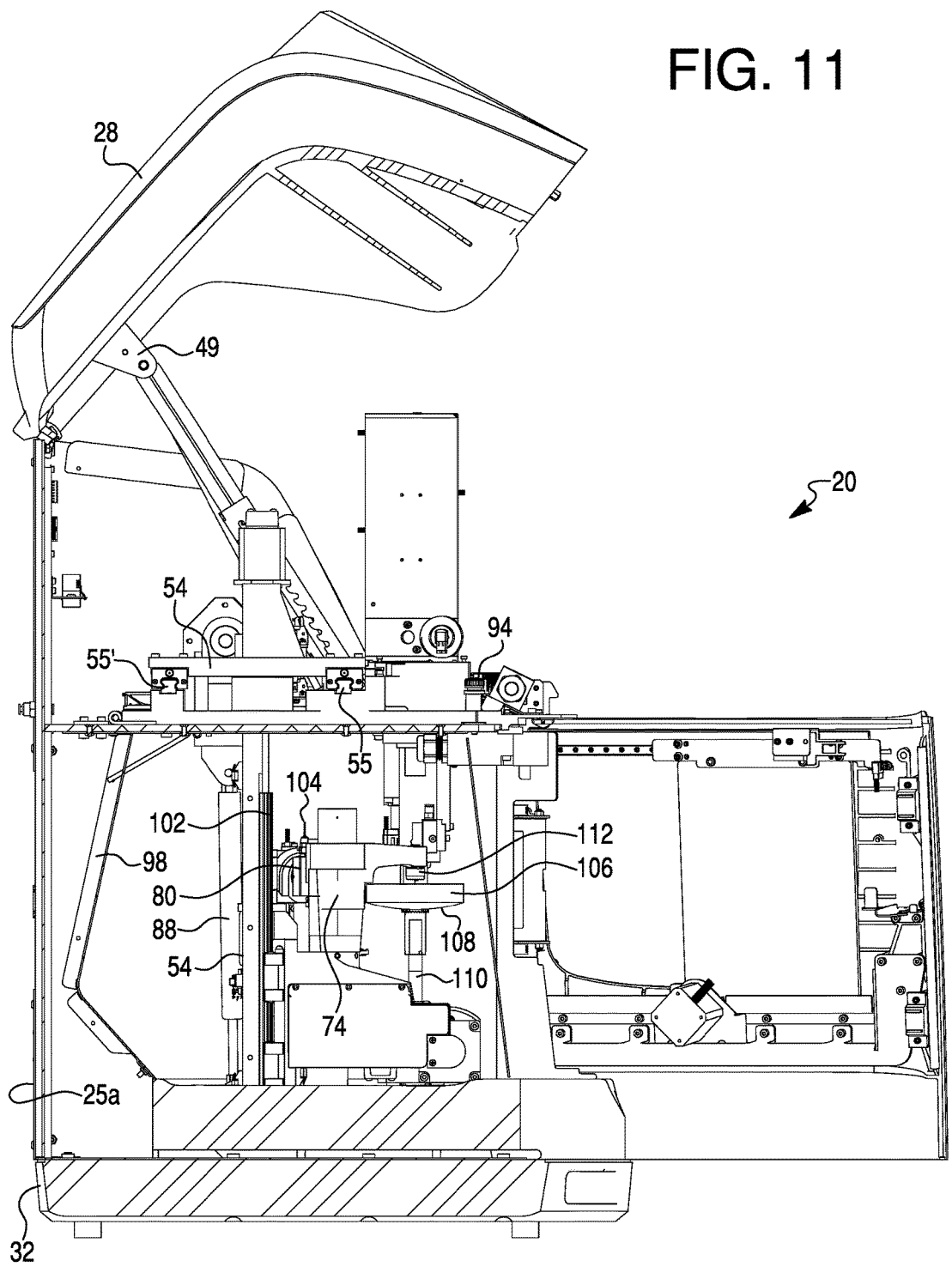
FIG. 11 is a cross-sectional view similar to FIG. 3 illustrating the lens blank holding and rotating mechanisms.
Figure 13:
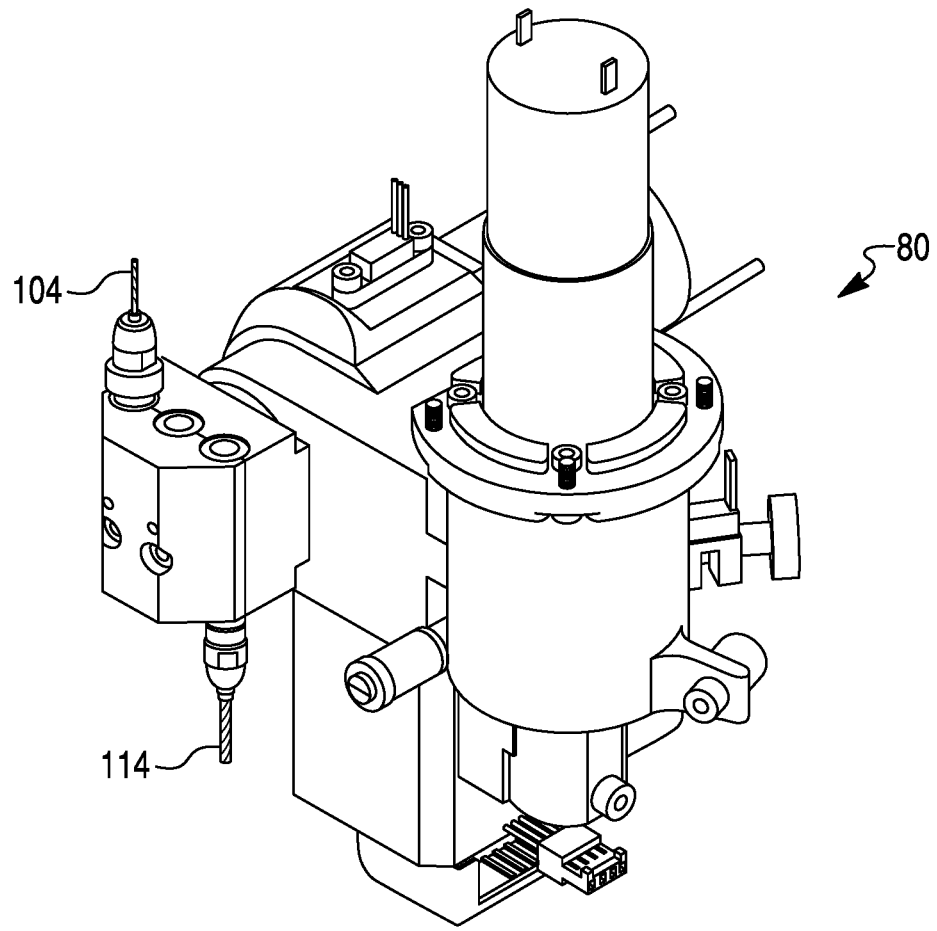
FIG. 13 is a perspective view of the drilling assembly.

FIG. 11 illustrates lens blank 106 secured to block 108 mounted to rotatable shaft 110. Also illustrated in FIGS. 11 and 12 is movable clamp 112 that is selectively clamped to lens blank 106 during the ophthalmic processing that transforms the lens blank 106 into an edged lens suitable for mounting into eyeglass frames. Those skilled in the art will understand that clamping of the lens blank 106 between the block 108, which is adhesively or otherwise secured to the lens blank 106, and the clamp 112 is controlled by a central processor unit ("CPU") secured to the hood 28. FIG. 13 illustrates the drilling assembly 80 and the drill 104 and milling bit 114 that is used to shape the lens blank 106 in certain lens configurations. The CPU rotates the shaft 110 and moves the stanchion 54 and z-axis carriage 70 in order to shape the periphery of the lens blank 106 as is required to edge the lens blank. The CPU also controls operation of the drilling assembly 80 and of the drill 104 and the associated polishers, beveling tools and the like so that the drill 104 may selectively drill the lens blank 106 and the associated polishers, beveling tools and the like can otherwise finish the lens edge.

The foregoing description of the exemplary embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. An ophthalmic lens processing apparatus, comprising:
    a housing comprising a case and a user access member;
    a support structure comprising a support plate, the support structure being received within and movably connected to the case to permit non-linear movement of at least a portion of the support structure; and
    ophthalmic lens processing components configured to perform a lens shaping process on an ophthalmic lens, the ophthalmic lens processing components comprising a rotatable lens clamp configured to hold and rotate a lens blank and a tool spindle configured to drive a tool to edge the lens blank, the lens clamp and the tool spindle being mounted to and movable with the support structure.

2. The ophthalmic lens processing apparatus of claim 1, wherein the support plate is movable between a lower position and a raised position.

3. The ophthalmic lens processing apparatus of claim 1, wherein the support plate is pivotally connected to the case.

4. The ophthalmic lens processing apparatus of claim 1, wherein the support plate is pivotally connected to the case to permit movement of the support plate between a horizontal position and an obliquely angled raised position.

5. The ophthalmic lens processing apparatus of claim 1, wherein the user access member comprises a hood that is movably connected to the case to move upward into an open hood position.

6. The ophthalmic lens processing apparatus of claim 1, wherein the lens clamp is mounted below the support plate, and wherein the user access member comprises a door that is movably connected to the case to move away from the support plate into an open door position.

7. The ophthalmic lens processing apparatus of claim 1, wherein:
the at least one of the ophthalmic lens processing components comprises a first ophthalmic lens processing component mounted on a top side of the support plate and a second ophthalmic lens processing component mounted on a bottom side of the support plate.

8. The ophthalmic lens processing apparatus of claim 1, wherein the user access member comprises:
a first user access member configured as a hood that is pivotally connected to the case to pivot upward into an open hood position; and
a second user access member configured as a door that is pivotally connected to the case to pivot away from the support plate into an open door position.

9. The ophthalmic lens processing apparatus of claim 1, further comprising:
a hinge pivotally connecting an edge of the support plate to the case and configured to permit upward pivotal movement of an edge of the support plate.

10. The ophthalmic lens processing apparatus of claim 1, further comprising:
a hinge pivotally connecting a rear edge of the support plate to the case and configured to permit upward pivotal movement of a front edge of the support plate.

11. The ophthalmic lens processing apparatus of claim 1, wherein the support structure comprises the support plate and a stanchion movably connected to the support plate and extending downward directly below the support plate.

12. The ophthalmic lens processing apparatus of claim 1, further comprising:
a biasing member mounted below the support plate and connected to the support plate to urge the support plate upwards.

13. The ophthalmic lens processing apparatus of claim 12, wherein the biasing member comprises a lift gas spring.

14. The ophthalmic lens processing apparatus of claim 1, further comprising a lock constructed and arranged to lock the support plate in a substantially horizontal position.

15. The ophthalmic lens processing apparatus of claim 1, wherein a majority of the ophthalmic lens processing components configured to perform the ophthalmic process on the ophthalmic lens are mounted to the support structure.

16. The ophthalmic lens processing apparatus of claim 1, wherein all of the ophthalmic lens processing components configured to perform the ophthalmic process on the ophthalmic lens are mounted to the support structure.

17. The ophthalmic lens processing apparatus of claim 1, wherein the ophthalmic lens processing apparatus is an edger comprising an edger tool.

18. An ophthalmic lens edger, comprising:
a housing comprising a case and a user access member;
a support structure comprising a support plate and a stanchion extending downward directly below the support plate, the support structure being received within and movably connected to the case to permit non-linear movement of at least a portion of the support structure, the stanchion being reciprocally laterally movable relative to the support plate; and
ophthalmic lens processing components configured to perform a lens edging process on an ophthalmic lens, the ophthalmic lens processing components comprising a rotatable lens clamp configured to rotate and hold a lens blank and a tool spindle configured to drive a tool to edge the lens blank, the lens clamp and the tool spindle being mounted to and movable with the support structure.

19. The ophthalmic lens edger of claim 18, wherein the lens clamp is mounted on the stanchion to reciprocally laterally move with the stanchion.

20. The ophthalmic lens edger of claim 19, wherein the tool spindle is mounted to the support plate, and wherein the stanchion being reciprocally laterally movable relative to the tool spindle to move the lens clamp towards and away from the tool spindle.

21. The ophthalmic lens edger of claim 18, wherein the support plate is pivotally connected to the case to permit movement of the support plate between a horizontal position and an obliquely angled raised position.

* * * * *